(12) United States Patent
Van Loon et al.

(10) Patent No.: US 7,500,684 B2
(45) Date of Patent: Mar. 10, 2009

(54) CATERING ASSEMBLY

(75) Inventors: Laurentius Petrus Joseph Van Loon, Slootdorp (NL); Joost Cornelis Geluk, Geulle (NL)

(73) Assignee: Driessen Aerospace Group N.V., Wieringerwerf (NL)

( * ) Notice: Subject to any disclaimer, the term of this patent is extended or adjusted under 35 U.S.C. 154(b) by 457 days.

(21) Appl. No.: 10/545,446

(22) PCT Filed: Feb. 12, 2004

(86) PCT No.: PCT/NL2004/000105
§ 371 (c)(1),
(2), (4) Date: Aug. 15, 2005

(87) PCT Pub. No.: WO2004/071867
PCT Pub. Date: Aug. 26, 2004

(65) Prior Publication Data
US 2006/0145442 A1 Jul. 6, 2006

(30) Foreign Application Priority Data
Feb. 13, 2003 (NL) .................................. 1022675

(51) Int. Cl.
B62B 3/02 (2006.01)
(52) U.S. Cl. ...................... 280/79.3; 220/481; 206/503; 211/94.02
(58) Field of Classification Search ................ 280/79.3, 280/79.7; 220/480, 481; 206/503, 504, 508; 211/87.01, 94.01, 94.02, 103
See application file for complete search history.

(56) References Cited

U.S. PATENT DOCUMENTS

| 2,784,999 | A | * | 3/1957 | Hunt | 296/22 |
| 2,845,780 | A | * | 8/1958 | Conklin et al. | 62/291 |
| 3,275,393 | A | * | 9/1966 | Conklin et al. | 312/403 |
| 3,472,392 | A | * | 10/1969 | Hahn | 211/126.14 |
| 3,512,826 | A | * | 5/1970 | Hahn | 296/22 |
| 4,323,110 | A | * | 4/1982 | Rubbright et al. | 165/267 |
| 4,478,467 | A | * | 10/1984 | Tyndall | 312/249.9 |
| 6,068,356 | A | * | 5/2000 | Giuseppe | 312/290 |

(Continued)

FOREIGN PATENT DOCUMENTS

DE 298 02 457 4/1998

(Continued)

Primary Examiner—Christopher P Ellis
Assistant Examiner—John D Walters
(74) Attorney, Agent, or Firm—Young & Thompson

(57) ABSTRACT

A catering assembly for use with an aircraft or train includes a wall (1) provided with a multiplicity of slots (2) running in the vertical direction with undercuts as well as a multiplicity of essentially block-shaped modules (6) with runners (14) on the rear that can be accommodated in the undercut slots (2), the cross-sectional shape of which, viewed in the horizontal plane, corresponds to the cross-sectional shape of the undercut slots (2), viewed in the horizontal plane. The catering assembly furthermore includes lifting elements for raising or lowering the module (6), the runners (14) of which have been accommodated in a the undercut slot (2), over the wall. It is preferable if the slots (2) are widened in places (15) such that a runner (14) can be inserted here in the horizontal direction so as then to hook into the undercut slot (2) after being moved vertically.

20 Claims, 3 Drawing Sheets

U.S. PATENT DOCUMENTS

| | | | |
|---|---|---|---|
| 6,203,036 B1 * | 3/2001 | LaVaute et al. | 280/79.3 |
| 6,539,846 B2 * | 4/2003 | Citterio et al. | 99/468 |
| 6,817,757 B1 * | 11/2004 | Wallace | 374/120 |
| 2003/0226657 A1 * | 12/2003 | Wallace | 165/202 |
| 2004/0074399 A1 * | 4/2004 | Zhou et al. | 99/448 |

FOREIGN PATENT DOCUMENTS

| | | |
|---|---|---|
| EP | 0 661 015 | 7/1995 |
| WO | WO 9202160 A1 * | 2/1992 |
| WO | WO 97/14598 | 4/1997 |
| WO | WO 99/47023 | 9/1999 |

* cited by examiner

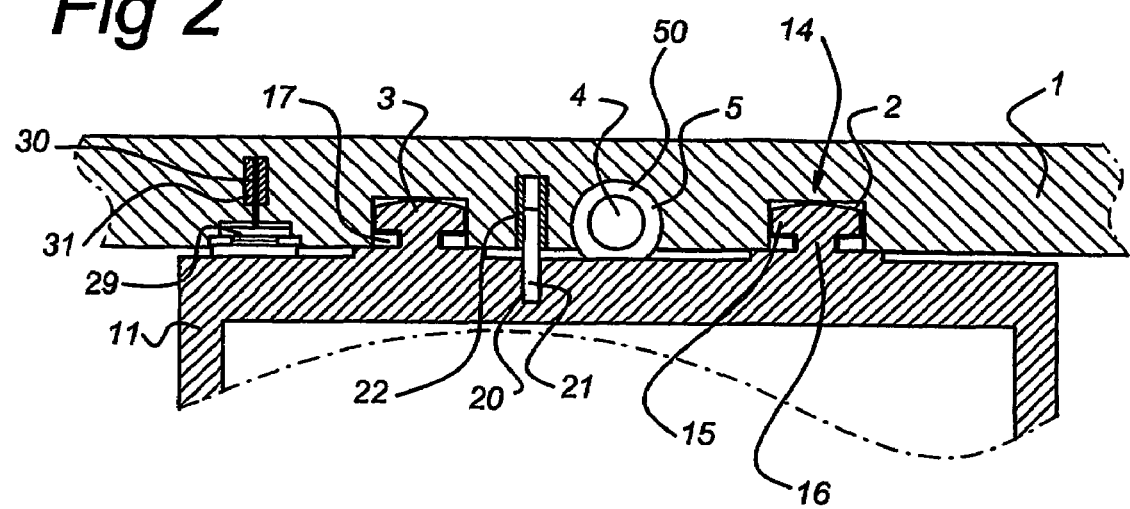
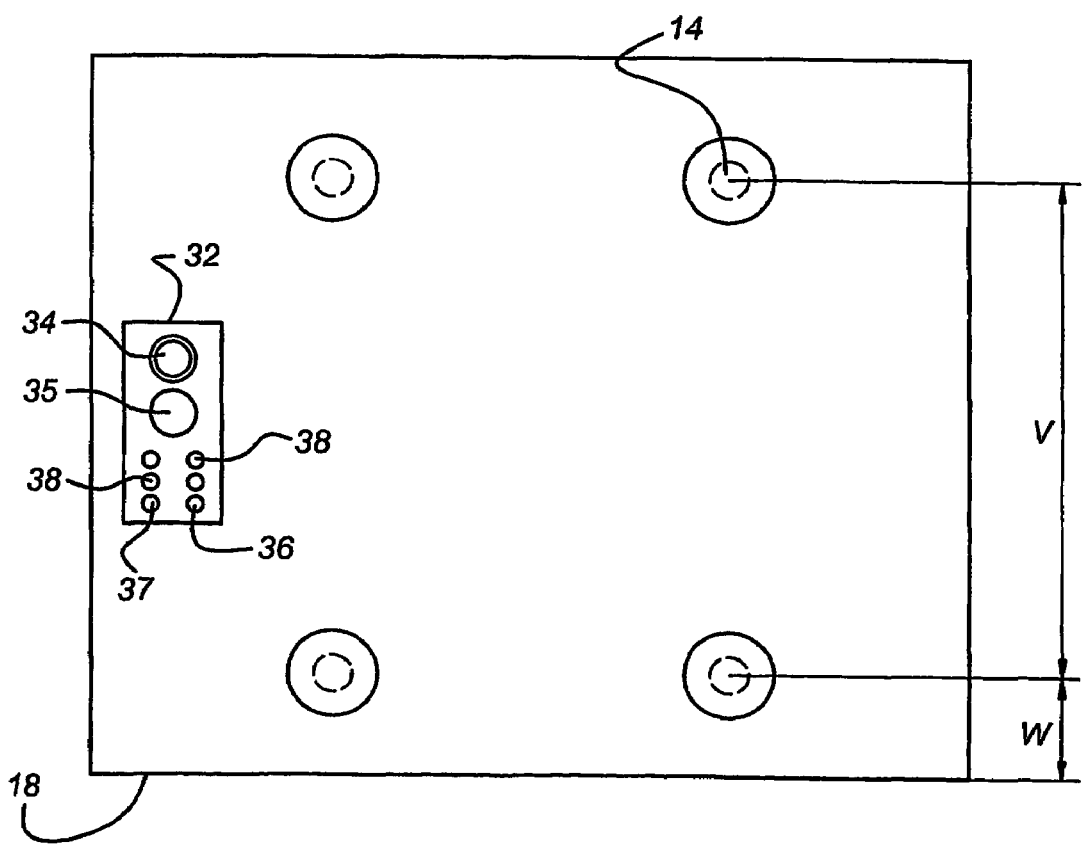

CATERING ASSEMBLY

The present invention relates to a catering assembly comprising a truck and a multiplicity of catering modules for an aircraft or train.

BREIF DESCRIPTION OF THE INVENTION

When transporting passengers by aircraft or train, in particular over longer distances, it is customary that the aircraft or the train is regularly provided with catering products (such as meals, snacks, drinks—both alcoholic and non-alcoholic, also including coffee and tea—, soups, tobacco products, duty free goods, etc.). There are also cases when the equipment in the galley of the aircraft or train is replaced, exchanged or arranged in a different composition. Leaving the patent application NL 1 021 107, filed on 18 Jul. 2002 in the name of the Applicant and not previously published, out of consideration, this is usually very time-consuming work that for this reason is mainly carried out during servicing.

Provisioning aircraft and also trains for catering purposes is a complete business on its own. In the case of aircraft this is carried out by bringing a multiplicity of catering modules in the form of so-called service trolleys to the aircraft by lorry and loading these trolleys into the aircraft, always before each flight in the case of long flights. With this procedure these service trolleys are then predominantly stored in the galley and sometimes in the cabin. At the catering company, that is to say the company that supplies the catering products and places these in the catering modules, catering modules are filled one by one. This is usually carried out in a not very efficient manner. Because, moreover, all catering modules are loaded individually onto the lorries and also handled individually in intermediate steps, there is also the risk that one or more catering modules are switched by mistake, so that catering modules are loaded into an aircraft that should have been loaded into another aircraft.

SUMMARY OF THE INVENTION

The present invention relates in particular to the process of delivering catering modules to aircraft and trains. The aim of the present invention is to make means available to make this process more efficient, i.e. to make the process more efficient.

According to the invention this aim is achieved by providing a catering assembly comprising a truck and a multiplicity of catering modules for an aircraft or train, wherein the truck comprises:

a chassis provided with wheels, and an upright wall fitted on the chassis, wherein the wall is provided on one side or both sides with supporting means for the multiplicity of catering modules.

By providing a catering assembly comprising a truck with a chassis, provided with wheels, on which an upright wall has been fitted, as a result of which the multiplicity of catering modules can again be supported, it is possible to move a multiplicity of catering modules grouped as a unit. This movement can be either from the aircraft/train to a catering company, from a catering company to the aircraft/train or within the catering company. Especially when the catering assembly is used within a catering company, the advantage is that the staff of the catering company are able to fill/stock the catering modules with easy access. It is necessary only to open the front of the catering modules and it is possible to place the catering products in the catering modules while standing in front of the mobile wall. The wall can optionally be provided with two layers of catering modules. It is also conceivable and even advantageous in practice to provide the wall with catering modules on two sides. On the one hand, this has a capacity advantage and on the other hand, that the wall is more stable and held in better balance. A major advantage of moving catering modules in groups, both within the catering company and between aircraft/train and catering company, is that it is possible to ensure that no catering modules from a batch are mistakenly switched for catering modules from another batch. In this way it can be ensured that the correct catering modules are loaded into the correct aircraft/train. Furthermore, it is easier to move a catering assembly according to the invention as a unit than to move each catering module independently, as frequently happens in the state of the art. The supporting means on the walls for the multiplicity of catering modules can be implemented in a wide variety of ways. In the case of conventional service trolleys in aircraft it is, for example, conceivable that the wall is provided with supporting panels or supporting racks running horizontally, in which the catering modules are placed. Consideration can also be given to supporting means in the form of hooks on which the catering modules are hung. It will be clear to a person skilled in the art that the supporting means can assume many diverse forms.

In order to be able easily to hang the catering modules one above the other on the wall without having to lift them and/or in order to bring the catering modules to a specific desired height, working height, preferably in the catering company, it is advantageous according to the invention if the truck further comprises lifting means for raising or lowering one or more modules over the wall.

In the case of a catering assembly according to the invention it is highly advantageous if the supporting means comprise, in a manner analogous to that in the case of the invention according to NL 1 021 107, which has already been mentioned above, a multiplicity of guides running in the vertical direction with undercut slots; and if each catering module is provided on the rear with runners that can be accommodated in the undercut slots.

By providing a wall with a multiplicity of guides running in the vertical direction with undercut slots and the catering modules, which preferably are essentially in the form of a block but also can very well be in the form of a worktop or a seat—that can be wall-mounted—for crew, to be provided at the rear with runners than can be accommodated in said undercut slots, as well as providing lifting means, it becomes possible to hook the catering modules by means of their undercut runners into an undercut slot and then to bring these to the correct height with respect to the wall by means of the lifting means. As soon as the undercut runners have been hooked into the undercut slots, the catering module is then attached to the wall and, except for the possibility of sliding along the slot, also fixed to the wall. With this arrangement the lifting means enable easy and rapid assembly without special tools, for example for bringing a catering module that is to be mounted high to the right height and position correctly in front of the wall. With this arrangement the runners can optionally be so constructed that they can be inserted in the slot in such a way that they can then be hooked into the undercut part of the slot by means of a projection, which can be swung inwards against resilient force to allow insertion in the slot. The guide with undercut slots can be rails mounted on the wall—projecting outwards with respect to the plane of the wall—, but can equally well be sunk in the wall, for example rails sunk in the wall or slots made directly in the wall. The wall can be either a fixed wall or a movable wall.

In order to ensure reliable, rattle-free fixing of the modules to the wall it is preferable according to the invention if the runners are of undercut construction corresponding to the slots. This is understood in particular to mean that, viewed in the horizontal plane, the runners have a cross-sectional shape that corresponds to the cross-sectional shape of the undercut slots, viewed in the horizontal plane.

With a view to reliable fixing of the modules to the wall and a simple procedure for this as well as a simple procedure for uncoupling the modules from the wall, it is preferable according to the invention if the slots are widened in places such that, on the one hand, a said undercut runner can be inserted here, essentially unimpeded, in the horizontal direction so as then to hook into the respective undercut slot after being moved vertically and that, on the other hand, the runner hooking into the slot can be removed from the slot in the horizontal direction after it has been positioned in the widened part of the slot. In this way it becomes possible, inter alia, to construct the runner as a component without moving parts, such as a moving projection. This makes functioning of the runner more reliable, in which context it must be borne in mind in particular that the runner is also an important component in locking the module to the aircraft. All that is needed to fix the module is for the runners of the module to be inserted via a widened section into one or more slots and then for the module to be moved, with or without the aid of the lifting means, along the slot, as a consequence of which the runners will hook into the undercut slot. Precisely the reverse procedure is adopted for removing a module from the wall; the module will be positioned, with or without the aid of the lifting means, such that the runners are in a widened section of the slot, after which the module can easily be removed from the wall.

In order further to facilitate the mounting of modules on the wall and the removal of modules from the wall, in particular so that the physical exertion of the personnel required is as low as possible, it is preferable according to the invention if the widened sections of the slots are provided close to the floor, or at least the bottom of the wall, such that a module placed on the floor, optionally also supported by a mobile platform, can be moved over the floor and placed in contact with the wall so that the runners project into the slot via the widened sections—lifting operations are not necessary for this—so as then to be able to raise the module up the slot to the desired mounting height with the aid of the lifting means. With this arrangement it will, in particular, be the case that the widened sections of the slots are at a height above the floor of the galley such that a module placed on the floor in front of the slot concerned completely overlaps the widened section.

According to a further advantageous embodiment of the invention, the slots, viewed in a horizontal plane, have an essentially T-shaped form, the leg of the T pointing away from the wall. In this way a slot is obtained that as it were is undercut on two sides, which makes it possible, in particular, reliably to prevent a module mounted on the wall from swinging with respect to the wall in the horizontal plane about an essentially vertical axis. A further requirement for this is that the runners on the module are constructed such that they are essentially undercut on two sides. An undercut of the runners on two sides can be achieved either by constructing each runner with an undercut on two sides—which is preferred—or by working with pairs of runners in each case, one of which, for example, is constructed with an undercut on the left and the other of which, for example, is constructed with the undercut on the right. According to a particularly preferred embodiment, the runners will be shaped like a mushroom.

It will be clear to those skilled in the art that the lifting means can be constructed in a wide variety of ways that fall within the scope of the claims. However, it is preferable to construct the lifting means such that they are reliable in operation and of simple construction. This can be achieved according to the invention if the lifting means comprise a spindle—provided with external screw thread—that runs vertically in the wall with a lifting arm that projects from the wall and can be moved along the spindle by means of matching internal screw thread. The spindle can be driven in a wide variety of ways to make it rotate, for example manually, but it will preferably be driven by a motor, for example by means of an electric motor. With this arrangement the number of revolutions that the spindle makes is proportional to the vertical height over which the lifting arm is raised or lowered. Such operation can easily be automated.

According to yet a further embodiment it is preferable if the catering assembly furthermore comprises locking means that are provided on the wall and on each module and interact with one another, for fixing a said module at a specific height. Such locking means can be constructed in a wide variety of ways and, if lifting means are present, make it possible for the lifting means to be uncoupled from the module after the module has been brought to the desired height so as to use these lifting means, for example, for bringing a subsequent module located below or optionally above to the correct height. According to the invention, the locking means can comprise a pin that is provided on the wall or the module and can be slid outwards in the horizontal direction, as well as a pin seat provided in the module or the wall—depending on where the pin is provided. The pin then as it were shoots or slides out of the wall or the module into the pin seat provided on the other part—the module or the wall—so as thus to fix the module on the wall in the vertical direction.

In order, insofar as is necessary, easily to be able to provide the modules with a gas, such as air, water, data and/or power, or, if appropriate, easily to be able to discharge a gas or water or to be able to output data from a module, it is preferable according to the invention if the wall and one or more of the modules are provided with connecting means for gas, water, data exchange and/or power. In this context the wall will, in particular, be provided with a connection unit equipped with a gas supply connector, a gas discharge connector, water supply connector, water discharge connector and a power connector and data communication bus. Furthermore, the wall will preferably also be provided with wireless communication means, by means of which information can be transmitted and/or received by wireless means. Depending on what is housed in the module, the module can then be provided with a matching gas supply connector and/or gas discharge connector and/or water supply connector and/or water discharge connector and/or power connector. What this then comes down to is that, as it were, an assembly of plug and socket is provided with connectors that can simply be pushed into one another. Such connectors that can simply be pushed into one another are known per se from the state of the art and do not require any further explanation for those skilled in the art. Thus, it is, for example, possible to keep the catering modules and goods contained therein cool, for example by means of electrical cooling means, such as Peltier elements.

According to a further embodiment, the catering assembly according to the invention comprises a number of vertical sections alongside one another, with, per section;

at least two of said slots;

in the wall, at least one gas supply, gas discharge, water supply, water discharge, power connector and data communication bus; and lifting means.

What is achieved by providing two slots per section is that a module can in each case be fixed to the wall via runners hooking into two slots, which is beneficial for the reliability of the fixing. As a result of providing lifting means per vertical section it is not necessary to move lifting means between the sections, which appreciably increases the ease of use when fitting and removing modules. By providing the wall per vertical section with every type of connection that can be needed, great freedom of arrangement is achieved with regard to the distribution of various types of modules over the wall.

According to a further aspect the present invention relates to a truck for a modular catering assembly according to the invention as well as to an aircraft or train provided with such a wall.

According to a further aspect the invention relates to the use of a catering assembly according to the invention for bringing catering modules to an aircraft or train or for taking catering modules away from an aircraft or train.

According to yet a further aspect, the present invention relates to a method for filling cabinet-like catering modules with catering products, wherein a multiplicity of catering modules are detachably mounted on a wall fitted on a chassis with wheels and successively wheeled past a number of stations and at each station one or more of the catering modules is provided with catering product/products located at that station. In this context, according to the invention it is particularly advantageous if catering modules for a predetermined aircraft or train are mounted on the wall and if an information carrier containing data on the predetermined, desired filling of the catering modules for that aircraft or train is provided at said wall.

BREIF DESCRIPTION OF THE SEVERAL VIEWS OF THE DRAWINGS

The present invention will be explained in more detail below with reference to an example shown highly diagrammatically in the drawing. In the drawing:

FIG. 2 shows, diagrammatically, a horizontal section of a detail according to the line II-II from FIG. 1;

FIG. 3 shows a diagrammatic view of the rear of a catering module, also termed galley module.

DETAILED DESCRIPTION OF THE PREFERRED EMBODIMENTS

Figure 1:
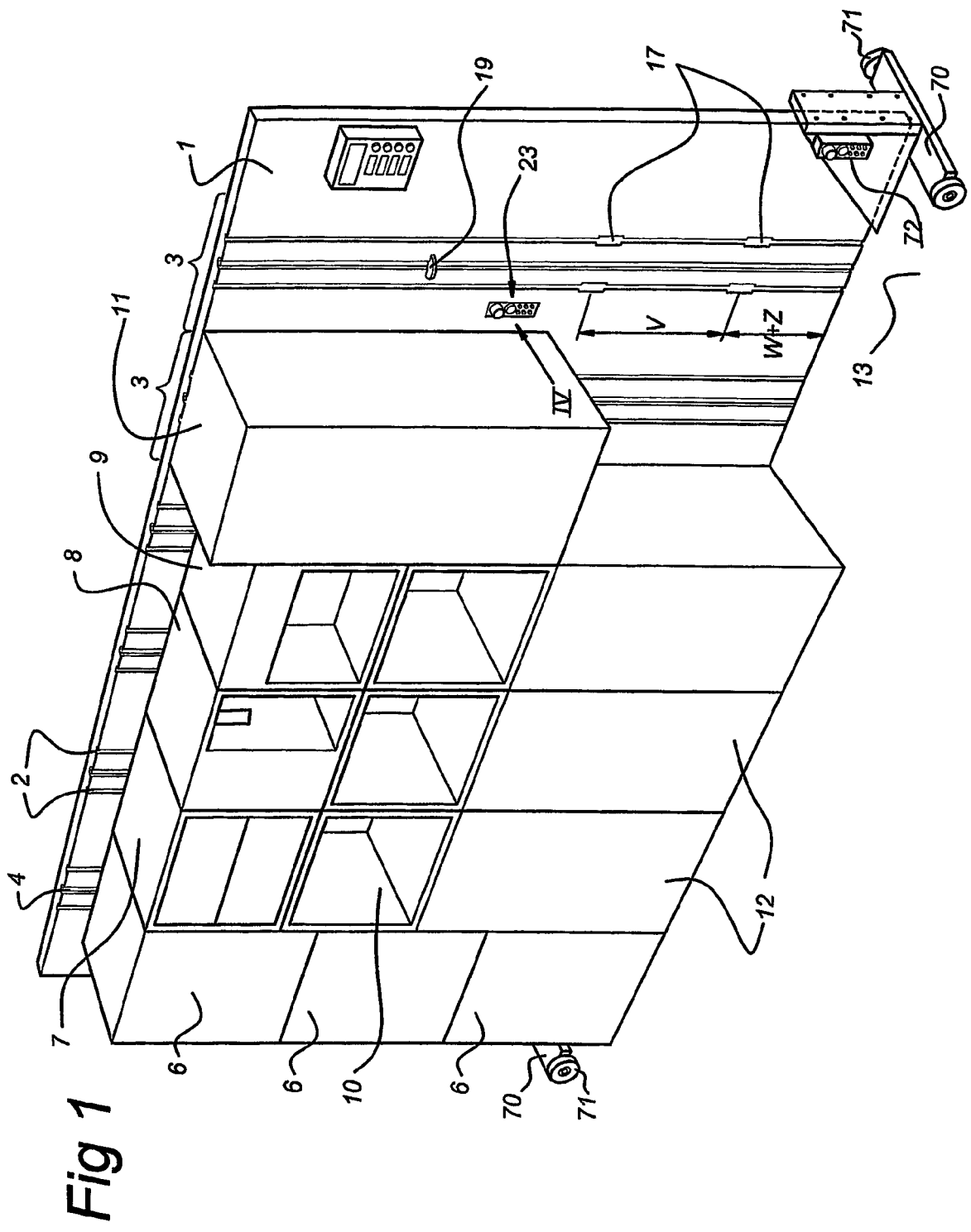
FIG. 1 shows a diagrammatic, perspective view of a modular catering assembly according to the invention.

With reference to, in particular, FIGS. 1 and 2, a wall 1, termed system wall, is shown. The system wall 1 is so to say sub-divided into vertical sections 3, six in the present case. Each vertical section 3 is provided with two slots 2 and a spindle 4. Here, per section 3, the spindle 4 is in each case fitted between two slots 2. However, it will be clear to those skilled in the art that it would be possible to work with one slot or with more than two slots 2 per section and that the spindle 4 does not necessarily have to be central, although this will be preferred.

The system wall 1 is fitted on a chassis 70 with wheels 71 and thus forms part of a truck. This truck is mobile. The wheels 71 can optionally be swivel castors. Furthermore, it can be possible to drive one or more wheels with a motor.

The system wall 1 will preferably be constructed correspondingly at the rear, which is not visible in FIG. 1.

As can be seen in particular in FIG. 2, each slot 2 has a T-shaped cross-section viewed in the horizontal plane, the so-called leg of the T-shape pointing away from the wall 1 so as thus to obtain a slot that is undercut on two sides.

The spindle 4 consists of a rod provided with external screw thread, on which a bush 5, which is provided with internal screw thread and externally has a non-circular peripheral shape, is provided. This bush is accommodated in a vertical guide 50 and because of its non-circular peripheral shape will be prevented from rotating in the vertical guide 50. The bush 5, in turn, supports a lifting arm 19 that projects from the wall 1.

Again with reference to, in particular, FIG. 1 it can be seen that a number of modules 6, 7, 8, 9, 10 and 11 have been mounted on the wall 1. As is indicated by the different reference numerals, these modules are of various types and/or of various sizes. The modules 6 are, for example, all cabinet modules with a door that can be opened and which is intended for housing stocks. The module 7 is, for example, a drawer module, the module 8 is a module by means of which ice cubes can be made, module 9 is a module for making coffee and tea and the modules 10 are a type of cabinet module with (not shown) a door that hinges about a horizontal hinge axis along the bottom edge so as to provide a worktop when hinged open. Module 11 is a refrigerator module. It should be clear that these modules are merely examples of possibilities and that a wide variety of other modules are possible and conceivable completely within the scope of the claims of the present application. For instance, inter alia, consideration can be given to a sink unit module with a water tap, an oven module, etc. All these modules are considered to be catering modules. However, it will be clear that in connection with stocking with catering products, in particular cabinet modules 6, 10 and drawer modules 7 are the modules that are transported by a catering company in order to be filled. However, it is also conceivable to place the entire catering assembly of truck and catering modules, optionally also equipped with galley equipment, as such in an aircraft or train. This makes it possible to construct the entire galley of an aircraft or train such that it is easily interchangeable.

So-called service trolleys with wheels or service trolleys without wheels 12 can be positioned underneath the modules 10 and 11. Here, the service trolleys are shown only as positioned underneath module 10; the service trolley that can be positioned underneath module 11 has not been shown in order to illustrate the various features. For the purposes of illustration, the right-hand section 3 of the wall has also been left free in FIG. 1. The service trolleys 12 provided with wheels can thus be taken away from the wall and wheeled through the cabin to provide the passengers with, for example, the desired snacks. In the case of service trolley modules without wheels, the service trolley modules will still have to be placed on a trolley frame with wheels in order to wheel them through the cabin.

As is shown in particular in FIGS. 2 and 3, each module is provided on the back with a number of runners 14. The number of runners 14 will be at least one per slot 2 and preferably two per slot 2.

So that the runners 14 are able to project into the respective slots 2 in such a way that the widened parts 15 of the runners 14 drop into the undercut of the slot 2, it would be possible to provide for the widened part 15 to be compressible against the action of, for example, a spring, such that they are initially completely within the body section 16 in order to be able to pass by the leg of T-shaped slot. However, such runners will require moving parts, which can adversely affect the reliability of operation. From this point of view it is preferable to construct the runners 14 without moving parts, for example, and preferably, to make them solid. In this way one arrives at the preferred embodiment of the runners 14, which is mushroom-shaped. So as to make it possible in the case of such runners 14 without moving parts that the runners fit in the slots 2 with their widened section in the undercuts, it is preferable according to the invention to make the slots 2 with widening in places, as has been illustrated in FIG. 2 in the case of the left-hand slot 2 and is indicated by 17 and is also shown by 17 in the two right-hand sections in FIG. 1. By aligning the runners 14 precisely in front of the widened zone 17 of the slot 2, the module can then be placed directly against the wall 1, the entire runner then being in the slot 2. What is achieved by now moving the runner 2 in the vertical direction together with the module is that the widened sections 15 of the runner 14 engage in the undercuts of the slot 2.

According to the invention it is preferable to provide the (lower) runners of a module on the rear of the module a fixed distance W above the bottom 18 of said module. This is irrespective of the height of the module itself. If the widened sections 17 of the slot are now provided in the wall 1 the same distance W above the floor 13, it is possible to push the modules placed on the floor 13 against the wall and in doing so simply to insert the runners 14 in the widened sections 17 of the slot. In this context it is optionally conceivable also to take account of a skate to be placed under the module, which skate will be at least a load-bearing platform with wheels. This makes it possible to wheel the module against the wall instead of pushing it. To give some idea, the height Z can be assumed for the height of this skate (in the absence of a skate Z will be 0). The corollary of this will be that either (as shown in FIGS. 1 and 3) the widened sections 17 in the wall 1 are made a height W+Z above the floor 3 or (not shown), which will probably be preferred, the runners 14 are positioned on the rear of the modules at a height W−Z above the bottom 18 of the module, at least if the module concerned is a module that will be wheeled over the floor with the aid of a skate.

If the modules are provided with two runners per slot 2, it is then preferable, for the reasons explained above, always to provide the higher runner 14 a fixed distance V above the lower runner 14 and to provide each slot 2 with two widened sections 17 for the slot, which are a distance V apart.

When a module is placed against the wall 1, the lifting arm 19 provided on the spindle 4 will be sunk in the floor 13 or, in the case of a skate, will drop into a recess in the skate or will optionally fit into a recess in the bottom of the module. As soon as the spindle 4 is then turned in the correct direction, the lifting arm 19 will rise and lift the modules 6, 7, 8, 9, 10 or 11 concerned up the wall 1, the runners 14 then hooking into the slot 2. In this way it will then be possible to raise the modules 6, 7, 8, 9, 10 or 11 to a height desired for that module.

As soon as the module has been brought to the desired height by means of the spindle 4 and lifting arm 19, it will have to be ensured in some way or other that the module 11 is held at that height. This can optionally be achieved by keeping the lifting arm 19 permanently at the relevant height. However, this is impractical if, as is shown in the two sections 3 on the left of FIG. 1, it is desired to fix several modules 6 to the wall 1 some distance above the ground. Specifically, it would then be necessary to provide several lifting arms on the spindle. In this context it is preferable to provide the wall and module with locking means that interact with one another. By way of example, an example of such locking means is shown highly diagrammatically in FIG. 2. The locking means shown in FIG. 2 comprise a pin 21 that can be moved by means of a coil 22 actuated electrically between a position in which it is retracted in the wall 1 and a position in which it protrudes from the wall 1 (which latter position in shown in FIG. 2). The coil 22 that can be actuated electrically is thus able to drive the pin 21 out of the wall into a pin seat 20 made in the module. It should be clear that in this way it is also possible fully to retract the pin 21 from the position shown in FIG. 2 back into the wall 1. It should also be clear that it is also conceivable to provide the pin 21 with coil 22 in the module and to provide the pin seat 20 in the wall. It is also conceivable to work with manually operated locking means.

Figure 4:
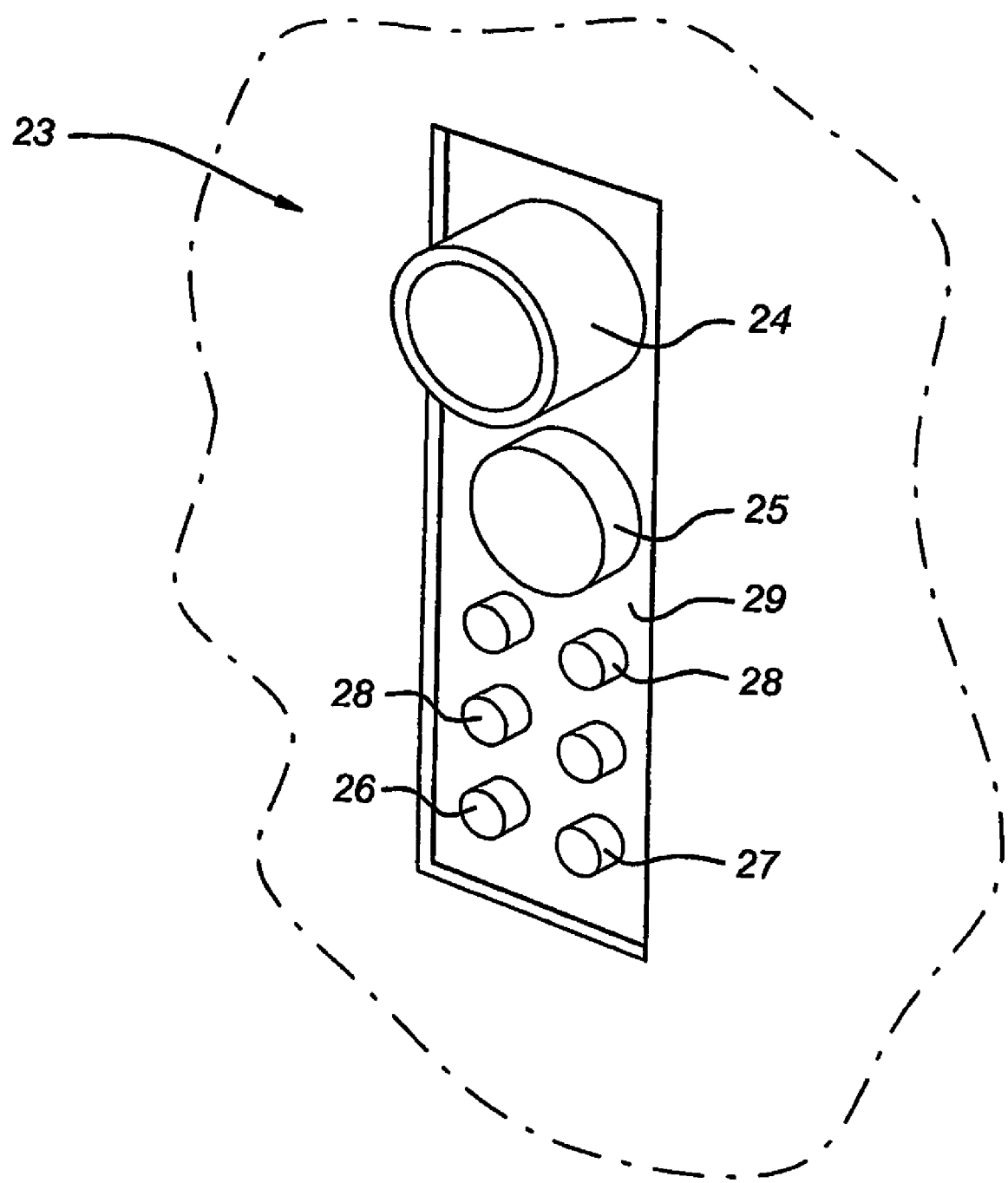
FIG. 4 shows an enlargement of the detail IV from FIG. 1.

The wall 1 is also provided, preferably per section 3, with a sort of plug, termed wall plug 23. The wall plug 23 shown on an enlarged scale in FIG. 4 comprises a supporting frame 29 with a compressed air connector 24, a gas discharge 25, a water supply 26, a water discharge 27 and four power connectors 28 thereon. As will be clear or will become clear to a person skilled in the art further types of connectors are provided on said one supporting frame 29. The supporting frame 29 can be made to stand proud of the wall and retracted into the wall by means of suitable means. This can, for example, be achieved by means of a pin 30 which can be moved in the longitudinal direction by means of a coil 31 that can be electrically actuated. Each module is provided with a corresponding socket, which latter is fixed to the module and is termed the module socket. The module socket 32 will preferably in each case be provided with matching connectors 34, 35, 36, 37, 38 only insofar as this is needed for the functioning of the equipment housed in the module concerned. As soon as a matching connector 34, 35, 36, 37 or 38 is then connected to a connector 24, 25, 26, 27 or 28 the connector 24, 25, 26, 27 or 28 provided on the wall will then, as it were, be opened at least insofar as this is a gas or liquid connector. In the case of, for example, a refrigerator module, a matching connector for compressed air, a matching connector for water supply and for water discharge will usually be superfluous. In the case of an oven module, usually only matching power connectors will be needed. As soon as the module has been brought into the correct position, the wall plug will be pushed forward from the wall, before, after or at the same time as the locking means, so as to be connected to the module socket 32 on the module concerned.

In order to feed the wall plugs 23, a similar plug 72 can be provided on the truck frame 70. In this way it can be ensured, amongst other things, that the wall can be connected to a power supply so that electrical cooling means present in modules keep the products chilled.

If it is now desired to remove a module from the wall it is necessary only to place the lifting arm under the module by operating the spindle, to retract the wall plug into the wall, to decouple the locking means and to lower the lifting arm with the module bearing thereon to, for example, the floor.

As far as the column of modules 6 down to the ground furthest on the left is concerned, it is pointed out that here the bottom module 6 can be connected to the wall in various ways, optionally with the aid of manually operated connectors. If the bottom module 6 is wheeled by means of a skate until it is in contact with the wall, it will be possible to use the lifting arm 19 and spindle 4 temporarily to lift the top and middle modules 6 together a little so that there is space for the skate and the bottom module 6 together. After the runners 14 of the bottom module 6 have then been inserted in the recesses 14, the skate can be pulled out and the bottom module 6 will lower of its own accord and in the meantime the runners 14 will engage in the undercuts of the slot 2. This can optionally be supported by an additional lifting arm 6. The top and middle module 6 can then be lowered onto the bottom module 6.

The invention claimed is:

1. A catering assembly having a truck and a multiplicity of catering modules for an aircraft or train, the truck comprising:
   a chassis provided with wheels; and
   an upright wall fitted on the chassis,
   wherein the wall is provided on at least one side with supporting means for the multiplicity of catering modules,
   wherein the supporting means comprise a multiplicity of guides running in a vertical direction with undercut slots, and
   wherein each catering module is provided on the rear with runners that can be accommodated in the undercut slots.

2. The catering assembly according to claim 1, the truck further comprising:
   lifting means for raising and lowering one or more modules over the wall.

3. The catering assembly according to claim 2, wherein the runners are undercut correspondingly to the slots.

4. The catering assembly according to claim 3, wherein the slots are widened in places such that said undercut runners can be inserted in the slots in a horizontal direction so as then, after positioning vertically, to hook into the respective undercut slot.

5. The catering assembly according to claim 4, wherein the widened sections of the slots are at a height above a floor of the galley such that a module placed on the floor in front of the slot concerned completely overlaps the widened section.

6. The catering assembly according to claim 2, wherein the slots, viewed in a horizontal plane, have an essentially T-shaped form, the leg of the T pointing away from the wall.

7. The catering assembly according to claim 2, wherein the runners are shaped like a mushroom.

8. The catering assembly according to claim 1, wherein the lifting means comprise a spindle that runs vertically in the wall with a lifting arm that projects from the wall and can be moved along the spindle by means of a matching internal screw thread.

9. The catering assembly according to claim 1, further comprising:
   locking means provided on the wall and on each module, the locking means configured to interact with one another for fixing a said module at a specific height.

10. The catering assembly according to claim 9, wherein the locking means comprise a pin that is provided on the wall or the module and slidable in a horizontal direction, and a pin seat provided in one of the module or the wall, respectively.

11. The catering assembly according to claim 1, wherein the wall and one or more of said modules are provided with connecting means for any of air, water, data exchange and power.

12. The catering assembly according to claim 1, further comprising:
   a number of vertical sections alongside one another, wherein each section has:
   at least one of said guides with slots,
   in the wall, at least one air, water and power connection, and
   lifting means.

13. Use of a catering assembly according to claim 1 for either of bringing catering modules to and taking catering modules away from any of an aircraft or train.

14. A method for filling cabinet-like catering modules with catering products, comprising the steps of:
   mounting a multiplicity of catering modules on a wall fitted on a chassis with wheels, successively wheeled past a number of filling stations; and
   at each filling station, providing one or more catering modules, for a predetermined aircraft or train, with at least one catering product located at the filling station,
   wherein an information carrier containing data on a predetermined, desired filling of the catering modules is provided at said wall.

15. The catering assembly according to claim 12, wherein each section also has, in the wall, at least one data bus.

16. A catering assembly having a truck and a multiplicity of catering modules for an aircraft or train, the truck comprising:
   a chassis provided with wheels; and
   an upright wall fitted on the chassis,
   wherein the wall is provided on at least one side of the wall with supporting means for the multiplicity of catering modules, and
   wherein the wall and one or more of said modules are provided with connecting means for any of air, water, data exchange and power.

17. The catering assembly according to claim 16, further comprising:
   locking means provided on the wall and on each module, the locking means configured to interact with one another for fixing a said module at a specific height.

18. The catering assembly according to claim 17, wherein the locking means comprise a pin that is provided on the wall or the module and slidable in a horizontal direction, and a pin seat provided in one of the module or the wall, respectively.

19. The catering assembly according to claim 16, further comprising:
   a number of vertical sections alongside one another, wherein each section has:
   at least one of said guides with slots,
   in the wall, at least one air, water and power connection, and
   lifting means.

20. Use of a catering assembly according to claim 16 for either of bringing catering modules to and taking catering modules away from any of an aircraft or train.

* * * * *